Oct. 7, 1958     C. A. SONDERSTRUP     2,855,255
SUPPORT CONSTRUCTION
Filed March 25, 1957
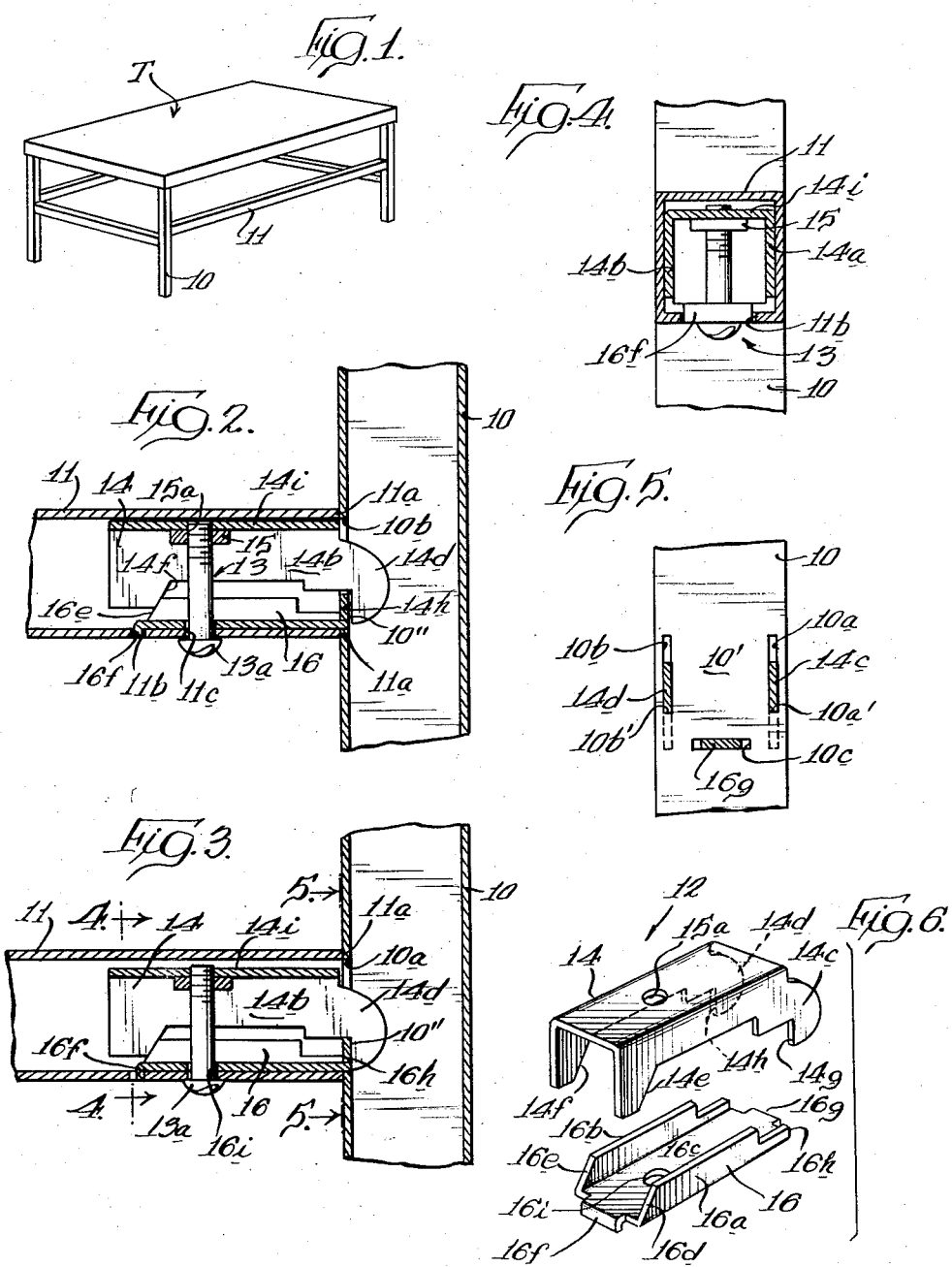
INVENTOR.
Christian A. Sonderstrup

United States Patent Office 2,855,255
Patented Oct. 7, 1958

2,855,255
SUPPORT CONSTRUCTION

Christian A. Sonderstrup, Maywood, Ill., assignor to Rada Products Company, a corporation of Illinois Application March 25, 1957, Serial No. 648,016

9 Claims. (Cl. 311—105)

This invention relates to a support construction and more particularly to a furniture support.

The use of metal legs and braces in present-day furniture construction is becoming increasingly more common. Such material provides improved strength and rigidity and, because of modern technical improvements, is simple and economical to manufacture. Two serious problems are found in such structures, however, namely: (1) difficulty in maintaining accurate, angular relationship of the legs and braces; and (2) difficulty in maintaining a clean, finished outer surface at the juncture and adjoining portions of the legs and braces.

The principal object of this invention is to provide a new and improved support construction arranged for accurate, angular relationship of the elements thereof.

Another object is to provide a support structure wherein the outer surfaces are substantially smooth.

A further object is to provide a support construction suitable for use in furniture wherein first and second support members are secured together in accurate, angular relationship by means of a connector substantially within one of the members.

Still another object is to provide a furniture support construction wherein the members are tubular, the connector comprises a pair of elements arranged to be tightened into accurate, angular projection from one member, and the second member is secured to the connector in accurate relationship to the first member.

A still further object is to provide such a connector whereby the means for effecting securing of the second member to the connector comprises the means for tightening the connector elements.

A yet further object is to provide such a furniture support construction wherein the tubular members are smooth throughout and are provided with a plurality of holes for reception of portions of the connector.

Other features and advantages of the invention will be apparent from the following description taken in connection with the accompanying drawings, wherein:

Fig. 1 is an isometric view of a table including a support construction embodying the invention;

Fig. 2 is an enlarged fragmentary, sectional view of the support construction with the elements thereof disposed as at the beginning of a securing operation;

Fig. 3 is an enlarged, fragmentary sectional view similar to that of Fig. 2 with the elements arranged as at the end of the securing operation;

Fig. 4 is a sectional view taken approximately along the line 4—4 of Fig. 3;

Fig. 5 is a sectional view taken approximately along the line 5—5 of Fig. 3; and Fig. 6 is an exploded, isometric view of the connector elements.

In the exemplary embodiment of the invention as disclosed in the drawings, a support construction is seen to comprise a first member 10 and a second member 11 secured to the first member by means of a connector 12. The first and second members may comprise portions of any appropriate structure; however, for illustrative purposes, they are herein disclosed as comprising portions of a furniture unit or table T. While the members may be disposed as desired relative to each other and to the vertical, the disclosed construction has been found to be particularly well suited for an arrangement wherein first member 10 comprises a vertical leg member, and second member 11 comprises a horizontal brace member. To permit ready and accurately arranged connection of brace member 11 to leg member 10, while avoiding external projections and similar deformation of these members, connector 12 is arranged to be received substantially fully within the brace, and only a small number of holes need be provided in the brace and leg members for installation of the connector.

Rigid attachment of member 11 to member 10 is effected by drawing the elements of connector 12 together and arranging the elements relative to the holes of members 10 and 11 so that when so drawn they have a rigid connection to each of the members. Rigid attachment of member 11 to connector 12 is effected by drawing member 11 to connector 12 until member 11 is urged into the desired angular relationship to member 10. In the instant invention, a single force member, or stud 13, is utilized to effect both the drawing of the connector elements together and the drawing of the second member to the connector and, thus, only a single operation is necessary to effect both attachments.

The brace and leg members preferably comprise metallic, tubular members and, as herein disclosed, may be of rectangular, or square, cross section. At the surface portion 10' of leg 10, to which one end 11a of the brace member is to abut, the leg is provided with a pair of slots 10a and 10b extending longitudinally of the tube and spaced laterally substantially one from the other. A third slot 10c extends transversely across leg 10 at a distance substantially below the lower end of slots 10a and 10b and intermediate the edges of the leg.

Connector 12 includes a first, or upper, element 14 comprising a generally U-shaped channel having a pair of side walls 14a and 14b terminating at one end in a pair of ears 14c and 14d and enlarged at the other end to form a pair of camming surfaces 14e and 14f facing angularly toward the flanged end. Ears 14c and 14d are arranged to pass through slots 10a and 10b, respectively, and hook around lower edges of the slots 10a' and 10b', respectively. A bearing surface 14g on ear 14c and a bearing surface 14h on ear 14d abut the inner surface of the leg immediately below the slot edges 10a' and 10b'. Surfaces 14g and 14h are preferably perpendicular to the longitudinal axis of first element 14 so that the element extends substantially perpendicular to leg 10 when the surfaces abut the leg. As may best be seen in Figs. 2 and 3, however, element 14 may pivot somewhat relative to the leg about the slot edges 10a' and 10b', as will be made more clear hereinafter.

Secured to the web 14i of the upper element intermediate side walls 14a and 14b is a reinforcing means, such as plate 15 defining with web 14i a centrally threaded recess 15a. Recess 15a is arranged for coaction with stud 13, as will be made more clear hereinafter.

The second, or lower, element of connector 12 comprises a generally U-shaped channel member 16 having a pair of side walls 16a and 16b and a web 16c. The sidewalls terminate at one end in a pair of bearing surfaces 16d and 16e, respectively, complementary to and arranged for abutment with camming surfaces 14e and 14f of the upper element. Projecting from the web intermediate sidewalls 16a and 16b, at the end of element having bearing surfaces 16d and 16e, is a downwardly curved projection 16f for cooperation with brace 11, as subsequently will be made clear. Extending from the web at the opposite end of the element, is a pivot projection 16g arranged to project into slot 10c of the leg and prevent lateral movement of the connector longitudinally of the leg. End 16h of the second element from which pivot projection 16g projects defines a shoulder which limits the insertion of projection 16g into the leg 10. Extending through web 16c of the brace, intermediate sidewalls 16a and 16b, and in alignment with plate recess 15a, is an opening, or passage, 16i having a diameter slightly larger than that of the shank of stud 13.

As discussed above, connector 12 is disposed substantially fully within the brace 11 and serves to retain the brace 11 accurately angularly to the leg 10. The brace is locked to the connector primarily through coaction with projection 16f of the second element. For this purpose, brace member 11 is provided with a transverse slot 11b adapted for cooperation with projection 16f. The spacing of the slot 11b from end 11a of the brace is preferably not less than the spacing of projection 16f from end 16h of the element. End 11a is preferably arranged to lie in a plane accurately angularly related to the axis of member 11a similarly as the desired angles between the axes of members 10 and 11. Thus, in the illustrated embodiment, end 11a lies in a plane accurately perpendicular to the axis of the brace.

A hole 11c is provided through the wall of member 11 in alignment with passage 16i of the lower element and recess 15a of the connector plate, and threaded stud 13 extends through the hole and passage to have engagement with recess 15a.

As stud 13 is advanced, elements 14 and 16 are drawn together. The angular disposition of surfaces 14e, 14f and 16d, 16e is such that this drawing together of the elements effects a wedging action, whereby surfaces 14e and 14f and therefore the element 14 are forcibly urged away from leg 10, and surfaces 16d and 16e and therefore element 16 are urged forcibly toward leg 10. When the elements are drawn to the position of Fig. 3, a stable, rigid configuration results with surfaces 14g and 14h of ears 14c and 14d bearing forcibly against inner wall surface 10" of the leg and tube end 11a bearing forcibly against the outer surface 10' of the leg. Head 13a of stud 13 may effect the accurate, angular securing of brace 11 to the leg by drawing the adjacent brace wall against web 16c of the lower element, which web may be fixed thereby at the desired angle relative to the leg. Stud 13 may also effect the desired securing by causing end 16h of element 16 to bear forcibly against the leg member and draw the brace by means of projection 16f longitudinally toward the leg. This longitudinal drawing causes the end 11a of the brace to have forced engagement with surface 10' of the leg. As discussed above, brace end 11a is arranged to lie in a plane accurately perpendicular to the axis of the brace and, thus, this forceful engagement causes the brace to extend accurately perpendicular to surface 10'. It should be noted at this point that the angular relationship of the plane of end 11a to the axis of the brace is related to the desired angular relationship of the brace and leg and may be at whatever angle is proper for this relationship, for example, the angle could be such as to allow the brace to extend angularly upwardly to engage the under side of the table top, in lieu of extending generally horizontally to engage another leg, as in the illustrated embodiment. Further, it should be understood that end 11a need not be planer, but merely be arranged to engage positively the leg surface when the leg and brace are properly angularly related. Thus, if leg 10 were of circular cross section, end 11a could be of complementary, arcuate shape.

As the first and second elements are positively locked by the drawing, or tightening, action of stud 13, the support construction may be utilized with first member 10 arranged horizontally, or angularly, to the horizontal, as well as vertically, as illustrated. When utilized as illustrated, with leg 10 extending vertically, however, it may be seen that the natural tendency of the free end of the cantilevered member 11 to pivot downwardly is counteracted by the positive stop afforded by the second element, thereby providing improved rigidity.

Leg member 10 and brace member 11 are free of any external projections, and only the small number of slots 10a, 10b, 10c, and 11b, and hole 11c need be formed therein for use with the connector 12. Thus, the leg and brace members may be completely formed and exteriorly finished, such as by polishing, prior to the assembly of the support structure. This arrangement of the external surfaces of the leg and brace members without projecting portions thereon is herein defined as smooth.

To assemble the support construction, element 14 is loosely retained on the leg by inserting flanges 14c and 14d through slots 10a and 10b. Element 16 is loosely associated with the leg and element 14 by inserting pivot projecting 16g into slot 10c of the leg. Brace 11 is then loosely associated with the connector by moving end 11a over the loosely assembled elements 14 and 16 until end 11a abuts leg 10, at which point projection 16f may fall into slot 11b of the brace. Thereafter, simply by inserting stud 13 through hole 11c of the brace and passage 16i of the element 16 and threading stud 13 into recess 15a, the connector elements are drawn together into the rigid configuration described above the brace member 11 is drawn to the connector until the brace is accurately perpendicular to leg 10. To remove the brace from the leg, stud 13 need merely be withdrawn to loosen the connector and brace member and allow disengagement of projection 16f from slot 11b.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A support construction comprising: a first elongated member; a second elongated member; a connector having means for engaging the first member; and unitary means for causing the engagement of the connector means with the first member to be rigid and for associating the second member with the connector to fix the second member accurately angularly to the first member.

2. A support construction comprising: a first elongated member; a second elongated member; a connector substantially fully within the second member and having means for engaging the first member; and unitary means for causing the engagement of the connector means with the first member to be rigid and for associating the second member with the connector to fix the second member accurately angularly to the first member.

3. A support construction comprising: a first elongated member having a tubular portion; a second elongated member having a tubular portion terminating in an end disposed in a plane extending accurately angularly to the axis of the second member; a connector substantially fully within the tubular portion of the second member and having means projecting from said end and through the first member portion; and unitary means for causing the connector means to have a rigid engagement with the first member and for associating the second member with the connector to fix the second member accurately angularly to the first member with the end of the second member abutting the first member.

4. A support construction comprising: a first elongated member having a connecting surface; a second elongated member having an end complementary to said surface and related to the axis of the second member so that when the end engages the surface the axis of the second member is accurately disposed at a desired angle relative to the axis of the first member; and means connecting the second member to the first member with said end in engagement with said surface, said means including a connector having a plurality of portions arranged to be clamped to said first member when said portions are urged to a securing position, and a tightening member for urging said portions to said securing position and concurrently securing the second member to said portions.

5. A support construction comprising: a first tubular member; a second tubular member having an end; a connector in said end having a pair of coacting elements each provided with a portion projecting therefrom, the portion of one element extending through and engaging an inner surface of the first tubular member, and the portion of the other element being juxtaposed to an outer surface of the first tubular member; tightening means associated with the connector for forcibly wedging said elements and locking said portions in securing relationship with the first member surfaces; and means interconnecting the second member end and the connector to urge said end forcibly against the first member and resultingly fix the second member accurately angularly to the first member.

6. A support construction comprising: a first tubular member having at least two spaced openings; a second tubular member having an end; a connector removably in said end and having a first element with a flanged portion projecting therefrom and through one of said openings to engage the inner wall surface of the first member adjacent the one opening, and a second element with a projection received loosely in another of said openings and having a shoulder limiting the insertion of the projection therethrough; and means urging said first element away from the first member to force the flanged portion tightly against the inner wall surface of the first member and the second element toward the first member, said means causing said second member to move with said second element whereby said end bears tightly against the first member, thereby to fix the second member accurately angularly to the first member.

7. A furniture support construction comprising: a tubular leg having a pair of longitudinally spaced openings; a tubular brace having an end; and means for securing said end of the brace to the leg to retain the brace accurately angularly to the leg, including a pair of relatively laterally movable elements received substantially fully within the end of the brace, one element having flanged means projecting from said end through one of said leg openings and retained in the leg to limit movement of the one element away from the leg, and the other element having means projecting from said end and projecting into the other of said leg openings precluding lateral movement of the other element longitudinally of the leg, means securing the brace and other element against relative edgewise movement, cooperating surfaces on the elements respectively reacting against each other when the elements are drawn together to urge the one element away from the leg and the other element toward the leg thereby to wedge the elements and brace into a rigid connection with the leg, and means associated with the elements for drawing them together and for associating the brace with the elements to draw the brace end tightly against the leg and fix the brace accurately angularly to the leg.

8. A furniture support construction comprising: an upright, tubular leg having a pair of vertically spaced openings; a horizontal, tubular brace having an opening through the wall thereof adjacent one end; and means for securing said end of the brace to the leg to retain the brace accurately angularly to the leg including a pair of vertically related, generally horizontal elements received substantially fully within the end of the brace, the upper element having flanged means projecting from said end through the upper one of said leg openings and retained in the leg to limit movement of the upper element away from the leg, the lower element having means projecting from said end and projecting into the lower one of said leg openings precluding lateral movement of the lower element longitudinally of the leg, cooperating surfaces on the upper and lower elements respectively arranged to react against each other when the elements are drawn together to urge the upper element away from the leg and the lower element toward the leg; means for drawing the elements together, and means releasably locking the brace to the lower element including a projection on the lower element and extending through the opening in said brace for urging forcibly the second member toward the first member when the lower element is drawn toward the leg.

9. A furniture support construction comprising: an upright, tubular leg having a pair of vertically spaced openings; a horizontal, tubular brace having an end being in a plane disposed at a desired angle to the longitudinal axis of the brace and an opening through the wall of the brace spaced from said end; and means for securing the brace to the leg including a pair of vertically related, generally horizontal elements received substantially fully within the end of the brace, the upper element having flanged means projecting from said end through the upper one of said leg openings and retained in the leg to limit movement of the upper element away from the leg, the lower element having means projecting from said end and projecting into the lower of said leg openings with a shoulder thereon limiting insertion of the projection into the leg, cooperating surfaces on the upper and lower elements respectively arranged to react against each other when the elements are drawn together to urge the upper element away from the leg and the lower element toward the leg, and means associated with the elements for drawing them together and for associating the brace with the lower element for drawing the brace end tightly against the leg to fix the brace accurately angularly to the leg including a projection on the lower element engaging the opening in said brace, the spacing of the hole from the end of the brace being no greater than the spacing of the projection from the shoulder of the lower element.

References Cited in the file of this patent

UNITED STATES PATENTS

| | | |
|---|---|---|
| 642,962 | Danner | Feb. 6, 1900 |
| 1,215,763 | Beaty | Feb. 13, 1917 |
| 1,460,928 | Tilden | July 3, 1923 |
| 1,473,817 | Gorsline | Nov. 13, 1923 |
| 1,751,037 | Howse | Mar. 18, 1930 |